Oct. 31, 1950 A. L. LEE 2,527,942
BEARING ASSEMBLY
Filed May 21, 1945
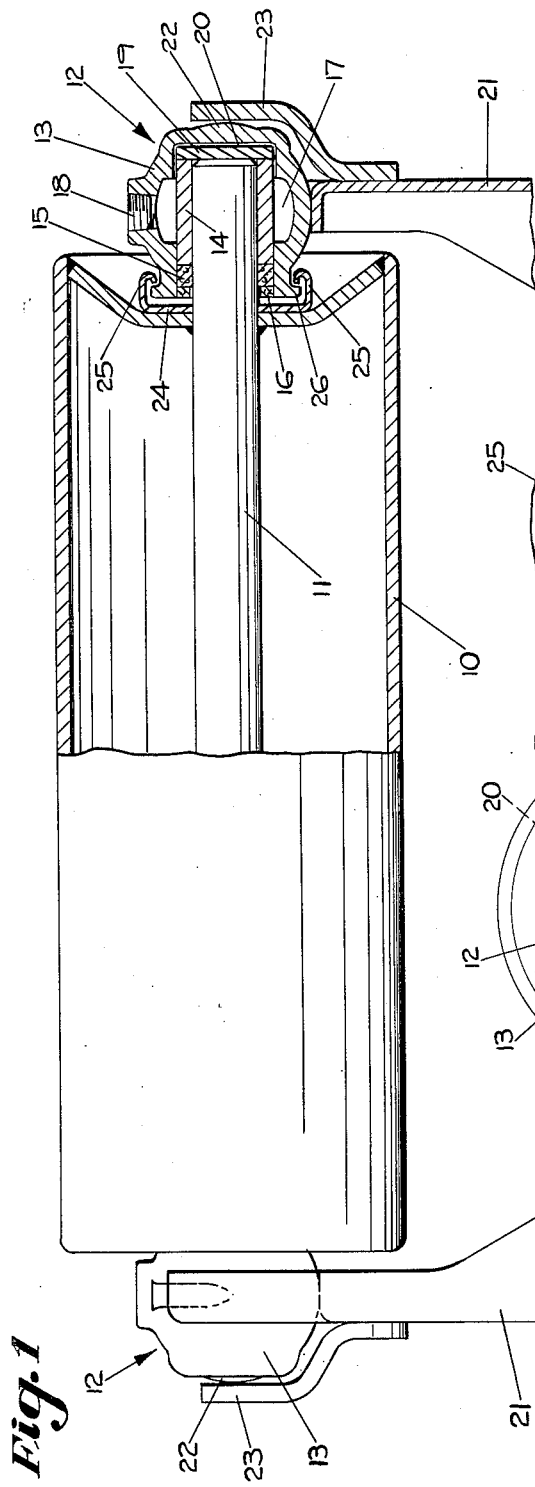
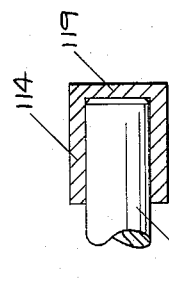
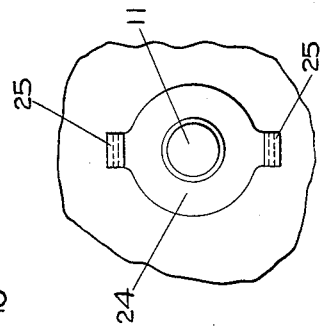
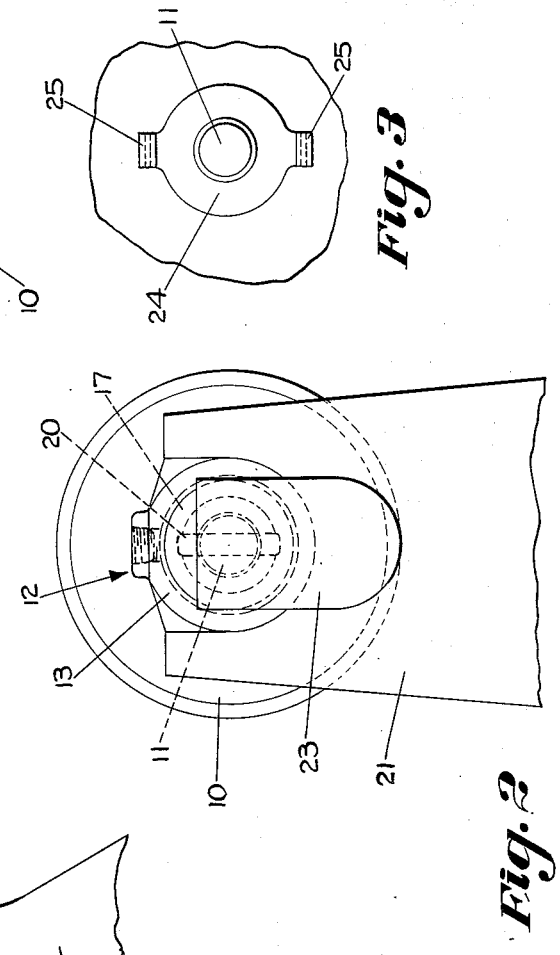
INVENTOR:
ARTHUR L. LEE,
BY
ATTY.

Patented Oct. 31, 1950

2,527,942

UNITED STATES PATENT OFFICE 2,527,942

BEARING ASSEMBLY

Arthur L. Lee, Upper Arlington, Ohio, assignor, by mesne assignments, to The Jeffrey Manufacturing Company, a corporation of Ohio Application May 21, 1945, Serial No. 595,048

1 Claim. (Cl. 308—121)

This invention relates to a belt idler and particularly to a bearing assembly for a belt idler.

An object of the invention is to provide an improved bearing assembly for an idler shaft or other shaft in which a porous bronze or similar sleeve bearing is employed and provided with a housing having an air-tight oil chamber, reservoir or cavity therein which is in direct communication with the porous bearing so that during operation of the device lubricating oil may be drawn from the reservoir, and during idle periods the oil will be drawn, at least in part, from the pores of the bronze bearing into the housing reservoir.

Another object of the invention is to provide a so-called "oil-less" porous bearing which is provided with a sealed oil reservoir adapted to insure long life of the bearing.

A further object of the invention is to provide an idler or shaft and bearing assembly including interlocking means to prevent accidental removal of the bearing assembly without any frictional contact between the interlocking means during operation of the device.

Another object of the invention is to provide an inexpensive bearing of the bronze bushed type which because of the lubrication means provided may operate for a great period of time without addition of lubricant.

Other objects of the invention will appear hereinafter, the novel features and combinations being set forth in the appended claim.

In the accompanying drawing,

Fig. 1 is an elevational view, with parts in section, showing an idler and bearing assembly incorporating the features of my invention;

Fig. 2 is an end view of the device of Fig. 1;

Fig. 3 is a partial end view of the idler of Figs. 1 and 2, with the bearing assembly removed; and Fig. 4 is a sectional view showing a modified form of bearing sleeve and its association with the idler shaft.

Referring particularly to Figs. 1 and 2 of the drawing, there is illustrated a belt idler supported on a pair of spaced stands or brackets and including an idler roller 10 provided with a live shaft 11 which is welded or otherwise rigidly attached to the end plates of the roller 10 and has end portions which extend outwardly therefrom. Each end of the shaft 11 is supported for rotation by a bearing assembly 12. Each bearing assembly 12 includes a housing or casing 13 bored with a cylindrical bore into which is pressed a porous bronze bushing or sleeve 14 or other porous metal bushing.

Adjacent the inner end of bushing or sleeve 14 and within the cylindrical bore of the housing or casing 13 is a flexible felt washer, ring or seal 15 which fits on the shaft 11 and which is held in the housing 13 by a holding ring 16 which preferably has a press fit with the cylindrical bore in said housing 13.

The interior of the housing 13 is provided with a circumferential chamber, cavity or reservoir 17 adapted to receive oil, said reservoir 17 having direct communication with the external cylindrical surface of the porous bronze bushing 14 so that lubricating oil within the reservoir 17 can readily flow into the pores of said bushing 14. A top opening by which oil is introduced into the chamber or cavity 17 is closed tightly with a pipe plug 18, or the like, to prevent loss of oil and also to prevent entrance of air into the chamber or reservoir 17 for reasons hereinafter explained more completely.

As illustrated in Fig. 1 of the drawing, the bushing or sleeve 14 is open at both ends and adjacent its outer end is provided with a separate thrust plate 19 preferably made of the same material as the bushing or sleeve 14.

As illustrated in the modification of Fig. 4 of the drawing, a bushing or sleeve 114 is provided which is similar to the bushing or sleeve 14, except that it has an integral head 119. Either form may be employed as desired.

The thrust plate 19 or the head 119, as the case may be, abuts the outer wall of the cylindrical bore in the housing 13. An oil groove or slot 20 is cored or otherwise formed in the housing 13 with its opposite ends communicating with diametrically opposite positions in the chamber 17 to provide for flow of oil to the closed end 119 of bushing 114 or thrust plate 19, as the case may be.

A substantial portion of the outer surface of casing 13 is formed as a segment of a sphere so as to provide a rolling bearing surface with a cooperating U-shaped bearing surface provided by supporting bracket or stand 21, thus providing a self-aligning feature for the two bearing assemblies 12 and the associated shaft 11.

The end thrust transferred by the shaft 11 to either housing 13 is also transmitted through a bearing surface in the form of a segment of a sphere, which is seen at 22, to a thrust clip 23 rigidly attached to bracket or stand 21. This self-aligning feature is generally similar to that disclosed and claimed in my application Serial No. 763,822, filed July 26, 1947, entitled Conveyer Belt Supporting Mechanism, which is a division of my application Serial No. 581,630, filed March 8, 1945, entitled Belt Conveyor.

It is evident that, in the absence of some retaining means, each bearing assembly 12 may be readily removed from the co-operating projecting portion of the shaft 11 by the simple expedient of removing it longitudinally therefrom. To provide means to hold each bearing assembly 12 on the shaft 11, thereby preventing its accidental removal and thus precluding its becoming lost when the idler assembly is removed from the stands or brackets 21, metal clips 24 rigidly attached to the roller 10 and shaft 11, as by welding or the like, are employed.

Each clip 24 includes a pair of diametrically opposite bent over wings 25 which shroud an outwardly extending peripheral flange 26 formed on the inner edge of housing 13. The spring in wings 25 provides for ready interlocking between them and the flange 26 by the simple expedient of forcing the casing 13 onto the shaft 11, with the inwardly bent free ends of the wings 25 causing the wings to spring outwardly until the parts are in the positions illustrated at the right in Fig. 1 of the drawing. In this position it is obvious that removal of the housing 13 is not permitted without an operator inserting a tool or otherwise spreading the wings 25 apart to free the interlocking relation between them and said flange 26. However, there is complete clearance between the flange 26 and the retaining clip 24 so that during operation of the idler little or no friction whatever is developed by this interlocking mechanism. This interlocking mechanism is described and claimed in my Patent No. 2,483,345, dated September 27, 1949.

The theory of operation of the bearing is believed to be in accordance with the following explanation. In so-called "oil-less" porous bearings oil is fed to the shaft surface by capillary attraction, such action varying with the viscosity of the oil. Oil is absorbed by the porous bronze bushing, also by capillary action. Reabsorption of oil by the bronze from the bearing surface also occurs when rotation of the associated shaft ceases. Thus the oil tends to retain in the bearing or bushing and near the bearing surfaces. Any oil which seeps too great a distance from the bearing will be lost and require replacement. This loss or leakage is generally very small as evidenced by the relatively long life of said so-called "oil-less" type bearings which receive only the initial impregnation of oil.

It is desirable that the life of the bearing or, in other words, the period between lubrication requirement, be increased and this is accomplished in the structure of my invention in the following manner. Oil is introduced into the chamber, cavity or reservoir 17 and the porous bronze bearing 14 or 114, as the case may be, becomes saturated or is previously saturated and the cavity or chamber 17 is filled. Plug 18 is then inserted to provide the air-tight characteristic of the cavity or chamber 17. No part of bearing 14 is exposed to the atmosphere, as provided by housing 13 and the cooperation therewith of shaft 11 and seal means 15 and 16, so no oil is lost by direct leakage from the porous sleeve or bearing 14. During rotation of the shaft 11 oil is taken up by the shaft bearing surface establishing lubrication, and a small amount of oil is removed from the bronze bearing or bushing 14 which is replaced in turn by oil taken from the reservoir or chamber 17. Since the pores of the bronze bushing or bearing 14 are small and are closed to the passage of air by the surface tension of oil retained in the voids of the bearing metal, a low vacuum or reduced pressure is established within the reservoir or compartment 17.

The low vacuum effectively establishes a balance of pressure in which further removal of oil from the bearing or sleeve 14 by the associated portion of shaft 11 is controlled so that excessive leakage or loss of oil is prevented. Over a long period of time in operation some oil will escape along the shaft surfaces or will be absorbed by an accumulation of dust or lint at the edge of the bearing 14 and as oil is removed from the porous bearing or sleeve 14 to replace this loss of oil the vacuum in chamber 17 is increased until it may be possible that air will overcome the surface tension and a small amount of air will enter the cavity or chamber 17 until the balance of pressure is again restored. When rotation of the shaft 11 ceases, the small vacuum existing in chamber 17 recovers a great portion of the oil from the shaft surface, a fluid flow existing at this time through the porous ducts of the bearing metal of sleeve 14.

From the foregoing it is apparent that an automatic lubrication system is provided wherein only a sufficient quantity of oil is allowed to be taken or drained from the chamber or reservoir 17 for adequate lubrication. The lubricating pressure is placed in equilibrium with a small amount of vacuum in chamber 17 to prevent leakage, and a large portion of the oil required for fluid support of the bearing portions of shaft 11 in the bearings or sleeves 14 is reclaimed by the vacuum in the chamber 17 instead of, as is the usual case, allowing it to seep or leak from the bearing ends. A simple bearing providing for radial load, thrust load and self-alignment is also provided, and all of the foregoing characteristics are obtained in an inexpensive design.

With respect to the co-operating interlocking means 25 and 26, it is, of course, evident that this as well as the self-aligning and radial load and thrust load taking features are applicable to anti-friction bearings, such as of the ball or roller type, as well as to the bronze bushed bearing herein specifically illustrated.

Obviously those skilled in the art may make various changes in the details and arrangement of parts without departing from the spirit and scope of the invention as defined by the claim hereto appended, and I therefore wish not to be restricted to the precise construction herein disclosed.

Having thus described and shown an embodiment of my invention, what I desire to secure by Letters Patent of the United States is:

A bearing and shaft assembly including a shaft having a portion adapted to turn in a sleeve bearing, a sleeve bearing of porous material supporting said shaft for rotation, a housing for said sleeve bearing having an oil cavity sealed from the air and communicating with said sleeve bearing, said shaft extending into said housing through an opening, and seal means at said opening including a flexible ring interposed between said shaft and said housing whereby said porous sleeve bearing is completely enclosed and sealed in from contact with atmospheric air through the cooperation of said housing, shaft and seal construction.

ARTHUR L. LEE.

(References on following page)

REFERENCES CITED

The following references are of record in the file of this patent:

UNITED STATES PATENTS

| Number | Name | Date |
|---|---|---|
| 855,903 | Packer | June 4, 1907 |
| 2,189,117 | Prentice | Feb. 6, 1940 |
| 2,270,392 | Talmage et al. | Jan. 20, 1942 |
| 2,312,610 | Weiss et al. | Mar. 2, 1943 |
| 2,406,891 | Newton | Sept. 3, 1946 |

FOREIGN PATENTS

| Number | Country | Date |
|---|---|---|
| 540,865 | Great Britain | Nov. 3, 1941 |